United States Patent [19]

Torikoshi

[11] Patent Number: 5,254,975
[45] Date of Patent: Oct. 19, 1993

[54] COMPENSATION TYPE HEAT SENSOR

[75] Inventor: Yasuo Torikoshi, Kawasaki, Japan

[73] Assignee: Hochiki Kabushiki Kaisha, Tokyo, Japan

[21] Appl. No.: 859,103

[22] Filed: Mar. 27, 1992

[30] Foreign Application Priority Data

Mar. 29, 1991 [JP] Japan .................. 3-66036

[51] Int. Cl.$^5$ .............................. G08B 17/06
[52] U.S. Cl. ................... 340/589; 307/117; 323/369; 340/584; 340/595; 374/183
[58] Field of Search ............... 340/589, 584, 595; 374/103; 307/117; 337/298; 323/369

[56] References Cited

U.S. PATENT DOCUMENTS 3,686,517  8/1972  Sexton, Jr. ............... 323/369
3,728,702  4/1973  Miyamoto et al. ........ 340/595

*Primary Examiner*—Glen R. Swann, III
*Attorney, Agent, or Firm*—Max Fogiel

[57] ABSTRACT

A pair of temperature detection devices having different heat time constants and an active device having a predetermined bias are connected in series. The bias is set so as to cause the active device to operate in a saturated region if the temperature is higher than a dangerous level, and to operate in a triode region if the temperature is lower than the dangerous level. The temperature detection devices are chosen so as to cause the voltage generated at the junction of the temperature detection devices to be higher than a predetermined reference voltage if the temperature has been raised to the dangerous level when the temperature is raised slowly, or if the temperature is raised rapidly, even if the temperature is lower than the dangerous level. A constant temperature function and a differential function are generated to detect that a fire has taken place. In another embodiment, one of the temperature detection devices (in series with an active device) is arranged in parallel with the other temperature detection device (in series with a resistor). The relative voltages of the two temperature detection devices are monitored to detect a "too high" or "too rapidly increasing" temperature. The resultant compensation type heat sensor has a reduced number of elements, the cost of which can be reduced and which possess both the constant temperature function and the differential function.

6 Claims, 9 Drawing Sheets

Fig. 1
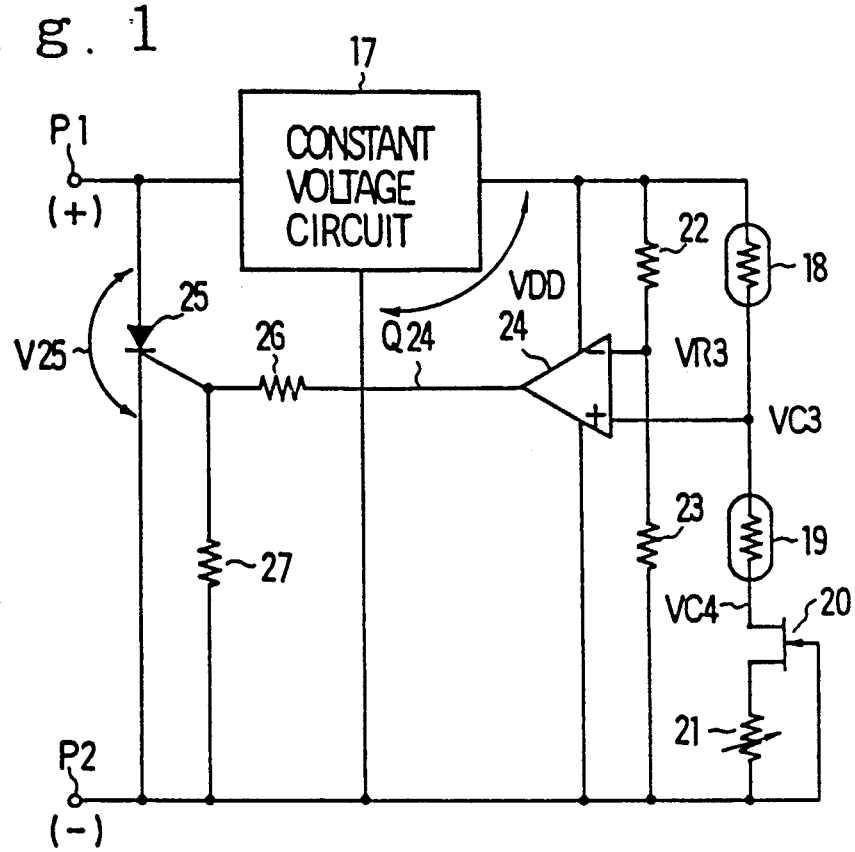
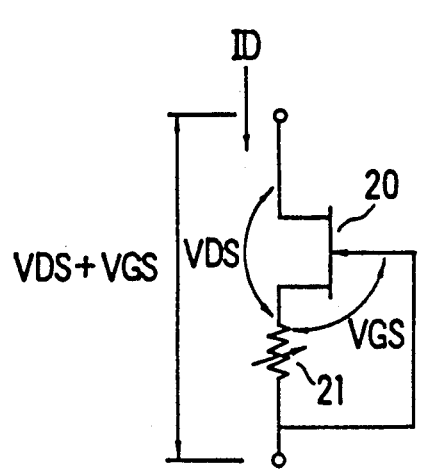
FIG. 2 (A)
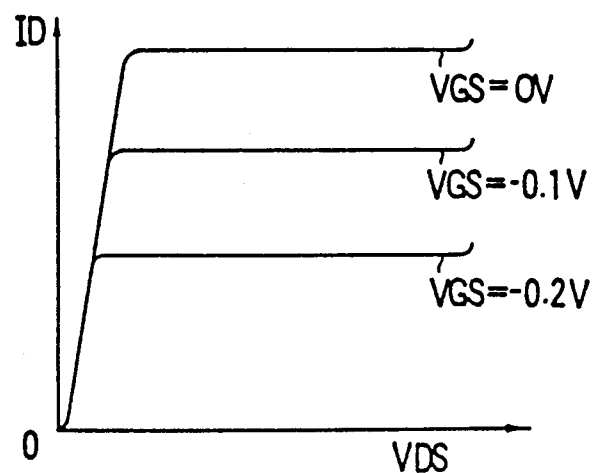
FIG. 2 (B)

FIG. 12 (A) (PRIOR ART)

COMPENSATION TYPE HEAT SENSOR

BACKGROUND OF THE INVENTION

1. Field of the Invention

The present invention relates to a heat sensor, and, more particularly to a compensation type heat sensor having a constant temperature function capable of detecting a fire by detecting the actual rise in temperature and a differential function capable of detecting, for example, an initial fire by detecting a rapid rise in the temperature.

2. Related Art Statement

Hitherto, a structure formed as shown in FIG. 11 has been known as a compensation type heat sensor of the aforementioned type. The sensor has both a constant temperature function realized by using a semiconductor thermistor device, the resistance value of which is changed depending upon the change in the temperature, so as to transmit alarm information when the temperature of a supervisory region has been raised to a predetermined dangerous level and a differential function for transmitting alarm information after it has detected a fact that the temperature of the supervisory region has been rapidly raised at a rate higher than a predetermined rate of rise in the temperature.

Referring to FIG. 11, the structure and the operation of the compensation type heat sensor will now be described. A positive connection terminal P1 and a negative connection terminal P2 are connected to a transmitting line extending from a receiver (omitted from illustration) disposed in a central supervisory room or the like. The aforesaid sensor receives electric power supplied from the receiver via the transmitting line and as well as transmits fire alarm information to the receiver. A constant voltage circuit 13 such as the three-terminal regulator connected to a position between the aforesaid connection terminals P1 and P2 forms a power supply voltage VDD capable of supplying predetermined voltage. The power supply voltage VDD acts to operate the following fire detection circuit.

Reference numeral 1 represents a thermistor device having a negative temperature coefficient with which the resistance value thereof is decreased as the temperature is raised. Reference numeral 2 represents a resistor having a predetermined resistance value. At a junction of the aforesaid elements 1 and 2, voltage VC1 is generated so as to be supplied to a non-reversal input contact of a comparator 5.

Reference numerals 3 and 4 represent resistors each having a predetermined resistance value. At a junction of the two resistors 3 and 4, reference voltage VR1 is generated so as to be supplied to a reversal input contact of the comparator 5.

If the aforesaid voltages hold a relationship VC1<VR1, the level of output signal of the comparator 5 becomes a logical value level "L". If a relationship VC1>VR1 is held due to the fact that the ambient temperature has exceeded the predetermined dangerous level, the level of the output signal Q5 becomes a logical value level "H".

Reference numeral 6 represents a reverse current prevention diode connected to an output contact of the comparator 5. The output signal Q5 transmitted from the comparator 5 and the diode 6 is supplied to a gate contact of a thyristor device 16 via voltage-dividing resistors 14 and 15. The signal denoting the level "H" of the output signal Q5 becomes a trigger gate signal for turning on the thyristor device 16.

The thyristor device 16 has the anode contact connected to the positive connection terminal P1 and the cathode contact connected to the negative connection terminal P2. When the thyristor device 16 is turned on in response to the aforesaid trigger gate signal applied to the position between the gate and cathode contact, it lowers the impedance between the connection terminals P1 and P2 to transmit fire generation information to the receiver.

Then, the operation of a control circuit constituted by the aforesaid devices will now be described with reference to FIG. 12. If the ambient temperature has been raised as shown in FIG. 12, the voltage VC1 is raised as the temperature is raised as shown in FIG. 12B. If the voltage VC1 exceeds the reference voltage VR1 at certain time T0, the output voltage Q5 of the comparator Q5 becomes the level "H" as shown in FIG. 12C. Simultaneously, voltage 16 between the connection terminals P1 and P2 is lowered, so that the fire alarm information is transmitted.

The resistance values of the resistors 2, 3 and 4 and the temperature characteristic of the thermistor device 1 are respectively determined so as to make the voltage VC1 and the reference voltage VR1 to be the same when the ambient temperature has been raised to temperature TR1 at which a discrimination must be made that a fire has been taken place.

Since the sensor circuit constituted by the elements 1 to 6, as described above, transmits alarm information when the ambient temperature has exceeded the predetermined dangerous level TR1, the circuit shown in FIG. 11 has the constant temperature function.

Further referring to FIG. 11, reference numerals 7 and 8 represent thermistor devices each having negative temperature characteristics. Voltage VC2 generated at their junction is supplied to a non-reversal input contact of the comparator 11, the two thermistor devices 7 and 8 having different heat responses. That is, the thermistor device 7 has a small heat time constant and thereby has quick heat response. On the other hand, the thermistor device 8 has low heat response because it has a large heat time constant. Therefore, if the temperature is rapidly raised, resistance value R7 of the thermistor device 7 is decreased quicker than resistance value R8 of the thermistor device 8. The voltage VC2 is rapidly raised when the resistance ratio R7/R8 is rapidly changed. The voltage VC2 divided by the pair of the thermistor devices 7 and 8 having different characteristics is, as described above, considerably changed when the ambient temperature has been rapidly changed. Therefore, the circuit 11 has a function to serve as a sensor capable of detecting a rapid rise in the temperature. In a case where the temperature is raised slowly, the resistance of the thermistor devices 7 and 8 become substantially the same. As a result, the resistance ratio R7/R8 becomes substantially constant and thereby the change in the voltage VC2 due to the rise in the temperature is extremely reduced.

Reference numerals 9 and 10 represent resistors each having a constant resistance. Reference voltage VR2 generated at their junction is supplied to a reversal input contact of the comparator 11.

If a relationship VC2<VR2 is held, output signal Q11 of the comparator 11 becomes the logical value level "L". On the other hand, the output signal Q11 becomes the logical value level "H" when a relationship VC2>VR2 is held because the ambient temperature has been rapidly raised due to a fire.

Reference numeral 12 represents a reverse-current prevention diode connected to an output contact of the comparator 11. The output signal Q11 transmitted from the comparator 11 and the diode 12 is supplied to the gate contact of a thyristor device 16 via the voltage-dividing resistors 14 and 15.

A sensor circuit constituted by the elements 7 to 12 has the aforementioned differential function which acts at this time. Hence, by turning on the thyristor device 16 at the time at which the output signal Q11 has become the logical value "H" to lower the impedance between the connection contact P1 and P2, alarm information is transmitted.

As described above, the conventional compensation type heat sensor has the constant temperature function for detecting a fire by detecting the actual rise in the temperature and the differential function capable of detecting, for example, the initial fire by detecting a rapid rise in the temperature, so that the fire detection can be performed basing on the actual fire generation mechanism.

However, the conventional compensation type heat sensor is constituted by individual circuits for corresponding functions. Therefore, there arises problems in that the overall cost and the size of the overall body of the sensor cannot be reduced because a too large number of parts must be used.

SUMMARY AND OUTLINE OF THE INVENTION

Accordingly, an object of the present invention is to provide a compensation type heat sensor in which the number of elements can be decreased, the cost of which can be reduced and which possesses both the constant temperature function and the differential function.

In order to achieve the aforesaid object, the present invention is structured to comprise two temperature detection devices (for example, thermistor devices) respectively having a small heat time constant and a large heat time constant and as well as both having a negative temperature coefficient and an active device (for example, a junction type field effect transistor) which are connected to one another in series and are connected to a predetermined power source. When comparison means detects a fact that the voltage of a connection contact of the temperature detection devices has exceeded a predetermined reference voltage, a discrimination is made that a fire has taken place.

In the aforesaid circuit, the two temperature detection devices and the bias of the active device are set as follows:

The active device is operated in a triode region as the resistance value of each of the temperature detection devices is changed before the temperature of a supervisory region is raised to a predetermined dangerous level, and the same is operated in a saturated region when the temperature has been raised to the dangerous level (bias setting condition 1).

Even if the active device is operated in the triode region in a case where the temperature is raised slowly, the voltage at the connection contact of the temperature detection devices is always lower than a reference voltage, and the voltage of the connection contact of the temperature detection devices becomes higher than the reference voltage when the temperature has been raised to the dangerous level (bias setting condition 2).

In a case where the temperature is rapidly raised in a state where the active device is operated in the triode region, the voltage of the connection contact of the temperature detection device is made higher than the reference voltage even if the temperature is not raised to the dangerous level (bias setting condition 3).

With the compensation type heat sensor having the sensor circuit thus constituted, the constant temperature function is exhibited in the case where the temperature is raised slowly. That is, the ratios of the resistance changes of the two temperature detection devices are changed at substantially the same rate. If the temperature is raised to a predetermined actual dangerous level, at which a discrimination is made that a fire has taken place, the voltage generated at the connection contact exceeds the reference voltage. Then, a comparator transmits a signal denoting a discrimination that a fire has taken place, so that the constant temperature function is exhibited.

On the other hand, the differential function is exhibited if the temperature has been raised rapidly. That is, since the resistance value of either of the temperature detection devices is changed quickly and as well as the output voltage of the constant current circuit is raised, the voltage generated at the connection contact quickly exceeds the reference voltage. As a result, the comparator quickly transmits a signal denoting a discrimination made that a fire has taken place, so that the differential function is exhibited.

As described above, the present invention is arranged in such a manner that the pair of temperature detection devices having different heat time constants and the active device having a predetermined bias are connected to one another in series. The bias of the active device is set so as to be operated in the saturated region in the case where the temperature is higher than the dangerous level and operated in the triode region in the case where the temperature is lower than dangerous level. In a case where the temperature has been raised slowly, the fact that a fire has taken place is detected if the voltage generated at the connection contacts of the temperature detection devices exceeds a predetermined reference voltage due to a fact that the temperature has been raised to the dangerous level or the temperature has been rapidly raised even if the temperature has not been raised to the dangerous level. As a result, both of the differential function and the constant temperature function are exhibited. Therefore, the number of the devices can be reduced to simplify the structure the circuit as compared with the convention structure.

It is preferable that the structure is constituted by a first series circuit network formed by, in series, connecting a first temperature detection device having a small heat time constant, a resistor and an active device and by further connecting them to a predetermined power source, and a second series circuit network formed by, in series, connecting a second temperature detection device having a heat time constant larger than that of the first temperature detection device and a resistor and by further connecting them to the predetermined power source.

The first temperature detection device and the bias of the active device are set in such a manner that: the active device is operated in a triode region as the resistance value of each of the temperature detection devices is changed before the temperature of a supervisory region is raised to a certain dangerous level, and the same is operated in a saturated region when the temperature has been raised to the dangerous level.

Even if the active device is operated in the triode region in a case where the temperature is raised slowly, the voltage of the first temperature detection device is always lower than that of the second temperature detection device, and the voltage of the first temperature detection device is raised to a level higher than that of the second temperature detection device when the temperature has been raised to the dangerous level.

In a case where the temperature is rapidly raised in a state where the active device is operated in the triode region, the voltage of the first temperature detection device is raised to a level higher than that of the second temperature detection device even if the temperature is not raised to the dangerous level.

Furthermore, when comparison means detects that the voltage of the first temperature detection device has exceeded the voltage of the second temperature detection device, a discrimination is made that a fire has taken place.

As described above, the compensation type heat sensor according to the present invention has both the constant temperature function and the differential function while being formed into a circuit necessitating a reduced number of elements.

Other and further objects, features and advantages of the invention will be appear more fully from the following description.

BRIEF DESCRIPTION OF THE DRAWINGS

FIG. 1 is a circuit diagram which illustrates a first embodiment of a compensation type heat sensor according to the present invention;

FIGS. 2(A) and 2(B) illustrate conditions for setting the bias of the circuit shown in FIG. 1;

DESCRIPTION OF THE PREFERRED EMBODIMENTS

Figure 3:
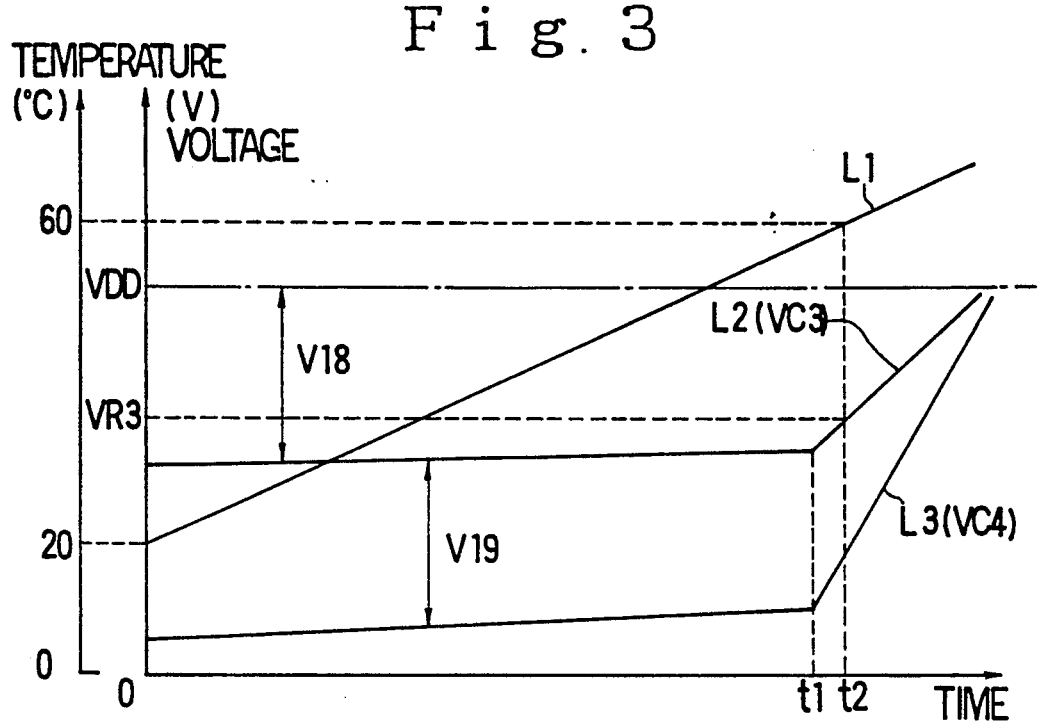
FIG. 3 is a graph which illustrates a constant temperature function of the circuit shown in FIG. 1.

An embodiment of the present invention will now be described with reference to the drawings.

First, the structure of a circuit will now be described with reference to FIG. 1. FIG. 1 is a circuit diagram which illustrates a first embodiment of a compensation type heat sensor according to the present invention. In a structure according to this embodiment, a positive connection terminal P1 and a negative connection terminal P2 are connected to a transmitting line extending from a receiver (omitted from illustration) disposed in a central supervisory room or the like. A constant voltage circuit 17 such as a three-terminal regulator or the like connected to a position between the connection terminals P1 and P2 forms a power supply VDD capable of supplying constant voltage. The power supply voltage VDD is used to operate the following circuit for detecting a fire. Reference numerals 18 and 19 represent thermistor devices each of which has a negative temperature coefficient. The thermistor device 18 has a small heat time constant, while the other thermistor device 19 has a large heat time constant as compared with that of the thermistor device 18. Therefore, if the temperature is raised rapidly, the resistance value R18 of the thermistor device 18 is quickly reduced as compared with the resistor value R19 of the thermistor device 19. If the temperature has been raised slowly, the resistance values R18 and R19 are reduced at substantially the same rate and the resistance ratio R18/R19 is maintained at substantially constant regardless of the change in the temperature.

Reference numeral 20 represents a junction type field effective transistor (JFET) having the drain contact, in this embodiment, connected to the thermistor device 19. The source contact of the transistor 20 is, via a variable resistor 21, connected to the connection contact P2, while the gate contact is directly connected to the connection contact P2.

In order to cause the transistor to be operated in a saturated region when the temperature has been raised to a dangerous level at the time of a fire and to be operated in a triode region when the temperature is lower than the dangerous level, the transistor 20 has a predetermined bias.

Reference numerals 22 and 23 represent resistors each having a predetermined value. Reference voltage VR3 generated at their junction is supplied to a reversal input contact of a comparator 24. The non-reversal input contact of the comparator 24 receives voltage VC3 generated at the junction between the thermistor devices 18 and 19.

If the voltages holds a relationship VC3<VR3, output signal Q24 of the comparator 24 becomes the logical value level "L". When a relationship VC3>VR3 is held as the rise of the ambient temperature due to a fire, the output signal Q24 becomes the logical value level "H".

Reference numeral 25 represents a thyristor device having an anode contact which is connected to the connection terminal P1, a cathode contact connected to the connection terminal P2 and a gate contact to which signal Q24 is supplied via a voltage dividing resistors 26 and 27. That is, when the output signal Q24 becomes the logical value level "H", the thyristor device 25 is turned on, causing the impedance between the connection contacts P1 and P2 to be lowered. Simultaneously, voltage V25 between the anode and the cathode is lowered, so that alarm information is supplied to a receiver (omitted from illustration).

Then, conditions for setting the bias of the transistor 20 will now be described with reference to FIG. 2. FIG. 2A is a partial enlarged view of FIG. 1 and FIG. 2B illustrates the relationship between the voltage between the drain and source of the transistor 20 and drain current ID of the same.

The characteristics of a circuit shown in FIG. 2A become as shown in FIG. 2B when voltage VGS between the gate and the source is changed by adjusting the resistance value of the resistor 21. In the triode region, the change in the voltage VDS between the drain and the source with respect to the change in drain current ID is extremely small as shown in FIG. 2B. On the other hand, the circuit has, in the saturated region, constant current characteristics such that the drain current ID is not significantly changed even if the voltage VDS between the drain and the source is changed. In order to obtain the constant temperature function and the differential function by utilizing the operation characteristics in the triode region and the saturated region, the bias of the transistor 20 is previously set.

In order to obtain the constant temperature function and the differential function, three conditions are set in this embodiment. As a first condition, a certain temperature is set to a dangerous level and the operation of the transistor 20 is adjusted so as to be changed across the aforesaid temperature. That is, in a period in which the temperature of the supervisory region has not been raised to the certain dangerous level (for example, 60° C.), the transistor 20 is operated in the triode region as the thermistor devices 18 and 19 are changed. If the temperature has exceeded the aforesaid dangerous level, the value of the resistor 21 is adjusted in accordance with the temperature characteristics of the thermistor devices 18, 19 and the transistor 20 so as to be operated in the saturated region.

As the second condition adapted to a case in which the temperature is slowly raised, the relationship between voltage VC3 of the junction contact between the thermistor devices 18 and 19 and reference voltage VR3 must always hold a relationship VC3<VR3 even if the transistor 20 is operated in the triode region and a relationship VC3>VR3 must be held when the temperature has been raised to the dangerous level. Therefore, the value of the resistor 21 is adjusted in accordance with the temperature characteristics of the thermistor devices 18, 19 and the transistor 20.

As the third condition, in order to realize the relationship VC3>VR3 even if the temperature has not been raised to the dangerous level in a case where the transistor 20 is operated in the triode region and the temperature is rapidly raised, the value of the resistor 21 is adjusted in accordance with the temperature characteristics of the thermistor devices 18, 19 and the transistor 20.

By previously adjusting the bias of the transistor 20 and the voltages VC3 and VR3 to meet the aforesaid conditions, the constant temperature function and the differential function can be obtained. That is, a discrimination that a fire has taken place is made if the temperature has been raised to the dangerous level in a case where the transistor 20 is being operated in the saturated region, so that the constant temperature function can be obtained. On the other hand, if the temperature has been rapidly raised when the transistor 20 is being operated in the triode region, a discrimination that a fire has taken place is made and therefore the differential function can be obtained.

Then, the operation of the compensation type heat sensor thus constituted according to this embodiment will now be described.

First, the constant temperature function will now be described with reference to characteristic curves shown in FIG. 3. FIG. 3 is a graph which illustrates a change in the voltage VC3 (designated by curve L2) in a case where the temperature is slowly raised (designated by curve L1) with respect to time and a change in the voltage VC4 (designated by curve L3) at the drain contact of the transistor 20. Therefore, the difference in the voltage between the voltage VDD and the voltage designated by the curve L2 is voltage V18 across the thermistor device 18, while the difference in the voltage between the curve L2 and L3 is voltage V19 of the thermistor device 19. The bias is set in this way that the transistor 20 is operated in the triode region before time t1 and the same is operated in the saturated region at time t2 slightly after t1.

Since both of the thermistors 18 and 19 have small resistance values in a case where the temperature of the supervisory region is low (room temperature), electric current ID passing through the transistor 20 becomes a low level and also the voltage VC4 is lowered.

Furthermore, the voltage VC3 becomes lower than the reference voltage VR3 by the predetermined resistance values of the thermistors 18 and 19. As a result, output signal of the comparator 24 becomes the level "L".

When the temperature has been then slowly raised as designated by straight line L1, the change in the voltage VC4 is extremely small before the time t1 and the resistance values of the thermistors 18 and 19 are substantially equally changed. Therefore, also the voltage VC3 is gradually raised as shown in FIG. 3. However, since the change in the voltage VC3 thus made will not cause the voltage level to be made higher than the voltage VR3, the output signal of the comparator 24 becomes level "L" and therefore a discrimination that a fire has taken place is not made.

If both of the temperature and the voltage VC3 have been raised causing the transistor 20 to be operated in the saturated region and the temperature has been raised to a level higher than the dangerous level (after the time t2), the voltages VC4 and VC3 at the drain contact of the transistor 20 are rapidly raised. If the voltages become VC3>VR3, the output of the comparator 24 is reversed to level "H", causing a discrimination to be made that a fire has taken place.

As described above, setting is made in this way that voltages become VC3<VR3 at temperatures below the dangerous level and the same becomes VC3>VR3 if the temperature has been raised to the dangerous level. Furthermore, the point at which the relationship of the voltages are changed is made coincide with the point at which the operation region of the transistor 20 is changed. Therefore, the major change in the status whether or not a fire has taken place can be detected, so that an excellent constant temperature characteristic can be obtained.

Figure 4:
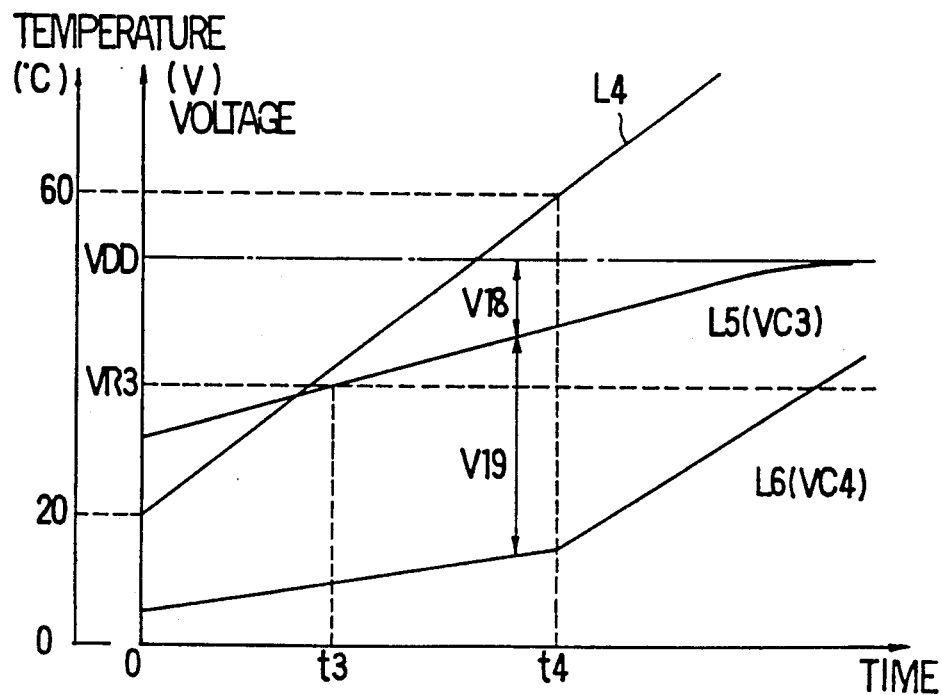
FIG. 4 is a graph which illustrates a differential function of the circuit shown in FIG. 1.

FIG. 4 illustrates a change in the voltage VC3 (designated by curve L5) in a case where the temperature is rapidly raised as time (designated by straight line L4) and change (designated by curve L6) in the voltage VC4 of the drain contact of the transistor 20. Therefore, the difference in the voltage between the voltage VDD and the voltage designated by the curve L5 is the voltage V18 across the thermistor device 18 and the difference in the voltage between the curve L5 and L6 is the voltage V19 across the thermistor device 19. In a period before time t4, the transistor 20 is operated in the triode region and the same is operated in the saturated region after time t4.

Referring to this drawing, both the thermistor devices 18 and 19 have large resistance values in a case where the temperature of the supervisory region is high (room temperature). Therefore, the electric current ID passing through the transistor 20 becomes a small level and also the voltage VC4 is lowered.

Furthermore, the voltage VC3 becomes a value lower than the reference voltage VR3 by the predetermined resistance values of the thermistor devices 18 and 19.

When the temperature has been rapidly raised as designated by the straight line L4, the resistance value of the thermistor device 18 revealing quick heat responsibility is decreased quicker than that of the thermistor device 19. Therefore, the voltage VC3 is rapidly raised to the reference voltage VR3 in a short time (from 0 to the time t3). Then, the output signal Q24 of the comparator 24 becomes the level "H" at the time t3, causing the thyristor 25 to be turned on and alarm information is transmitted to the receiver (omitted from illustration).

If the temperature has been raised as shown in a range from the time t3, the voltage across each of the thermistors 18 and 19 is lowered and thereby the transistor 20 is operated in the saturated region at certain time t4. Furthermore, if the temperature of the supervisory region is raised to the dangerous level, the voltage VC4 is rapidly raised.

As described above, even if the temperature is lower than the dangerous level, the transistor 20 is operated in a case where the temperature is raised rapidly. Furthermore, the difference between the resistance value of the thermistor device 18 and that of the thermistor device 19 is enlarged, causing the voltages to become VC3>VR3. Therefore, the differential function can be obtained.

Figure 5:
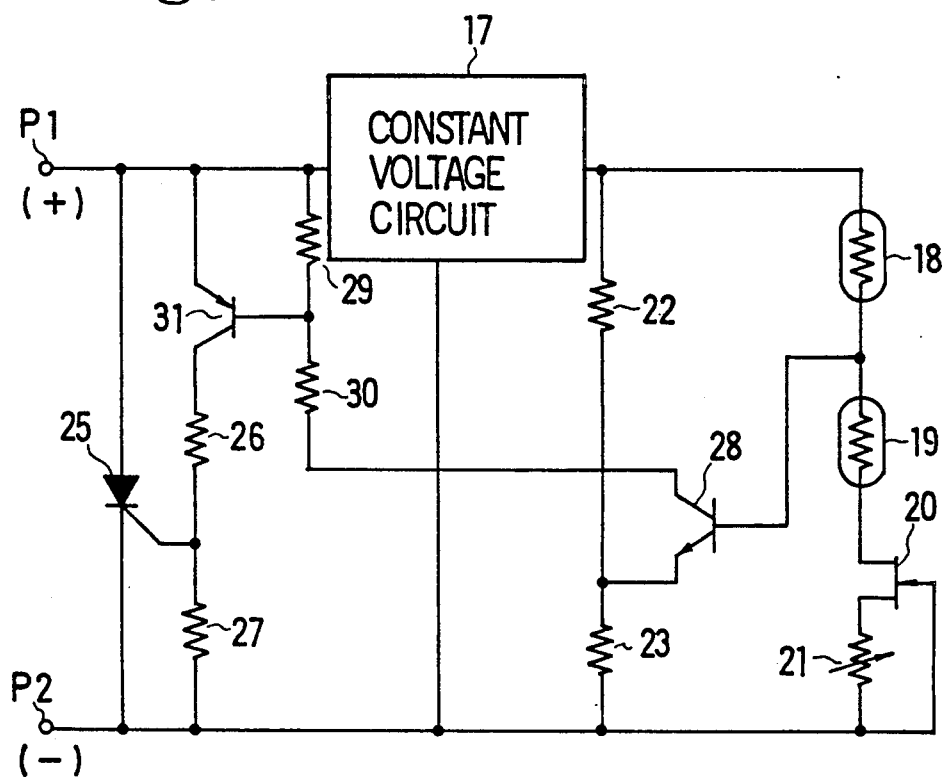
FIG. 5 is circuit diagram which illustrates a second embodiment of the compensation type heat sensor according to the present invention.

Then, a second embodiment of the compensation type heat sensor according to the present invention will now be described with reference to FIG. 5. Referring to FIG. 5, the same or equivalent elements to those shown in FIG. 1 are given the same reference numerals.

In this embodiment, the comparator 24 shown in FIG. 1 and comprising a complicated circuit including the differential pair is structured into a simplified circuit having the comparison function. That is, an NPN transistor 28 has a base contact to which the connection contact between the thermistor devices 18 and 19 is connected. Furthermore, the emitter contact of the NPN transistor 28 is connected to a connection contact between the resistors 22 and 23 which generate the reference voltage. That is, the structure is arranged in this way that the transistor 28 is turned on when the bias between the base and the emitter is made forward as the temperature rises.

Furthermore, the collector contact of the transistor 20 is connected to the base contact of a PNP transistor 31 via resistors 29 and 30 which form a bias circuit. On the other hand, its emitter contact is connected to the connection terminal P1 and the collector contact is connected to the gate contact of the thyristor device 25 via the resistors 26 and 27 which form the bias circuit.

The thermistors devices 18, 19, the transistor 20, the resistors 21, 22 and 23 are set to the same conditions as those according to the aforesaid embodiment shown in FIG. 1.

With the circuit thus constituted, if the temperature of the supervisory region has been raised to the temperature at which a discrimination is made that a fire has taken place, the NPN transistor 28 is turned on, causing the potential of the base contact of the PNP transistor 31 to be lowered. Furthermore, the level of the gate contact of the thyristor device 25 is raised to the level "H". As a result, the generation of a fire can be informed to the receiver (omitted from illustration).

Figure 6:
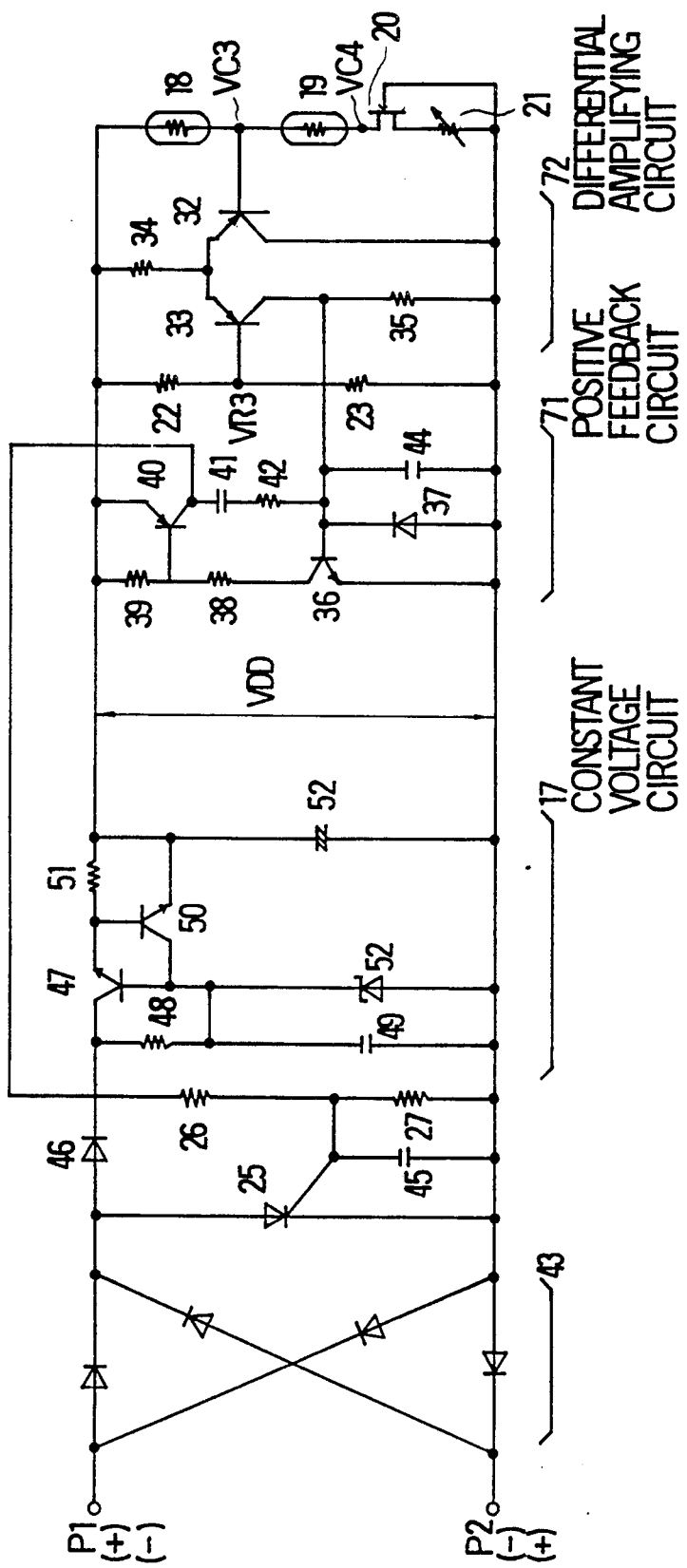
FIG. 6 is circuit diagram which illustrates a third embodiment of the compensation type heat sensor according to the present invention.

Then, a third embodiment of the heat sensor according to the present invention will now be described. FIG. 6 is a circuit diagram which illustrates the structure of this embodiment.

This embodiment is arranged to have two transistors so as to improve the temperature characteristics of the circuit according to the second embodiment in which one transistor is used. The circuit according to this embodiment is arranged similarly to the second embodiment in this way that it comprises the constant voltage circuit 17, a positive feedback circuit 71 and a differential amplifying circuit 72. However, a difference lies in that the differential amplifying circuit 72 includes two transistors.

Referring to FIG. 6, reference numerals 18 and 19 represent the thermistor devices, 20 represents a junction type field effect transistor, 32, 33 and 40 represents PNP transistors and 36, 47 and 50 represent NPN transistors. Reference numeral 43 represents a diode bridge for realizing a nonpolar state in which transmitting lines can be connected to P1 and P2 regardless of the polarity.

Reference numerals 44 and 45 represent noise absorbing capacitors, 46 represents a reverse-flow prevention diode, 37 represents a discharge passage (41 - 26 - 27 - 37 - 42 - 41) which acts when a charge of the capacitor 41 is discharged. The reverse-flow prevention diode 46 is a diode causing only voltage levels below the durable voltage to be applied between E and B of the transistor 36 to prevent the breakage of the transistor 36.

Then, the operation of the positive feedback circuit 71 will now be described. When the transistor 33 is turned on and a base current is commenced to flow to the NPN transistor 36, the collector current flows via the resistors R39 and R38 from the NPN transistor 36. Therefore, voltage is generated between the base and the emitter of the PNP transistor 40 by the resistor R39 and thereby the collector current is commenced to flow to the PNP transistor 40. When the base current is commenced to flow to the PNP transistor 40, the impedance of the capacitor 41 defined by 1/wc is zero. As a result, the collector current is fed back from the PNP transistor 40 to the base of the NPN transistor 36 via the resistors 41 and 42. The collector current at the NPN transistor 36 is increased because the aforesaid feedback of the base current is added, so that the NPN transistor 36 and the PNP transistor 40 are switched while causing the amplifying operation to be performed. Thus, the two transistors 36 and 40 are completely switched on (brought into the saturated state).

The collector current of the PNP transistor when the aforesaid switching operation has been performed is supplied to the gate of the SCR25 via the resistor R26. The SCR25 is thus triggered to short cut between terminals P1 and P2 to have a low impedance, so that information supply current is caused to flow to the receiver omitted from illustration.

On the other hand, the capacitor 41 disposed in the feedback circuit to the collector of the PNP transistor 40 and the base of the NPN transistor 36 is charged by the collector current of the PNP transistor. When charging of the capacitor 41 is completed after a predetermined time has passed, the feedback operation of the NPN transistor 36 to the base is stopped. As a result, the NPN transistor 36 and the PNP transistor 40 are again turned off. However, since the SCR 25 has been triggered, the conductive state of the SCR 25 is maintained even if the NPN transistor 36 and the PNP transistor 40 are turned off.

The electric current to be passed at the time of the switching operation performed due to the mutual feedback operation of the NPN transistor 36 and the PNP transistor 40 is made to flow by using a charge of a power-supply backup capacitor 52 disposed in the output section of the constant voltage circuit 17. Therefore, no current limiting operation by means of the constant voltage circuit 17 which will lower the power supply voltage is performed and thereby the problem taken place in that a fire cannot be detected can be prevented.

The differential amplifying circuit 72 according to this embodiment comprises two transistors. The reason for this lies in that the differential amplifyinq circuit 72 is given excellent temperature characteristics with which the information supplying characteristic are realized which are not easily changed due to the temperature of the environment of the sensor.

In a structure shown in FIG. 5 and comprising the comparison circuit constituted by one transistor, the transistor is turned on to cause the sensor to transmit alarm information when the base potential is raised to a level higher than the emitter potential by 0.6 V or more (since Vbe=0.6 V). However, Vbe of the transistor is ordinarily changed depending upon the temperature at a rate of −2.2 to −2.3 mV/°C. and thereby it becomes smaller than 0.6 V. As a result, alarm information is transmitted too earlier.

In the differential amplifying circuit comprising the two transistors as illustrated for the purpose of eliminating the influence of the temperature, Vbe of the transistor is set off, so that the temperature characteristics are improved.

The positive feedback circuit 71 causes the transistor to perform a positive feedback operation even if the output signal from the differential amplifying circuit 72 denotes a slow rise in the temperature so as to instantaneously turn on the thyristor 25. As a result, the speed at which the switching operation is performed can be raised and the electric current consumption is reduced immediately before the transmission of alarm information from the sensor to prevent the change in the bias condition of the FET due to the fact that the voltage of the circuit in the sensor is lowered.

Since the signals of the temperature detection circuits 18 to 21 are changed slowly at the time of the slow rise in the temperature, also the voltage generated between the resistors as the output from the differential amplifying circuit is changed slowly. When the aforesaid voltage is raised to a voltage region in which the transistor 36 is almost turned on, the transistor 40 is turned on by the amplifying effect. As a result, the base current of the transistor 36 is further increased and the positive feedback operation with which the transistor 36 is brought into a direction in which the same is turned on is performed, so that the electric current is instantaneously supplied to the gate of the thyristor 25 to turn on it.

If the positive feedback circuit 71 is not provided, the time required to perform switching (the time taken from the moment at which the transistor is switched on to the moment at which the same is switched off) becomes too long, causing the electric current consumption (the electric current flowing to the resistor 51) to be increased. As a result, Vdd is lowered. That is, the positive feedback circuit 71 is provided for the purpose of preventing a fact that a normal temperature detection operation cannot be performed due to the change in the bias condition of the FET. If the time required to complete the switching operation is short enough, the electric current consumption can be sufficiently charged by the capacitor 52 and the increase in the electric current consumption is small enough.

The constant voltage circuit 17 is formed by elements (47 to 52) as illustrated in the accompanying drawing because the cost can be reduced and the electric current consumption can be reduced as compared with a three-terminal regulator.

Then, alarm information transmitting process adapted to this embodiment will now be described. The potential changes at VC3, VC4 and VR3 during the alarm information transmitting process in the sensor are the same as those taken place in the structure shown in FIGS. 3 and 4.

In this case, the transistors 32 and 33 are made of the same kind transistors, so that they have the same characteristics such as Vbe. Therefore, if the present state of the potential is VR3=VC3, electric current i flowing to the resistor 34 flows equally to each of the transistors 32 and 33, that is i/2 flows to each of the transistors 32 and 33.

At this time, the potential of VR3 and VC3 in a normal temperature state at the supervisory region holds a relationship VR3>VC3 and all of the electric currents i are flowing to the transistor 32 having a low base potential. Therefore, no voltage is generated in the resistor 35, so that the positive feedback circuit 71 is not operated.

If the temperature of the supervisory region has been raised to the temperature at which a discrimination is made that a fire has taken place, a relationship VR3<VC3 is held, so that electric current i flows to the transistor 33 and voltage is generated in the resistor 35. As a result, the positive feedback circuit is operated to turn on the thyristor 25, causing alarm information to be transmitted.

Figure 7:
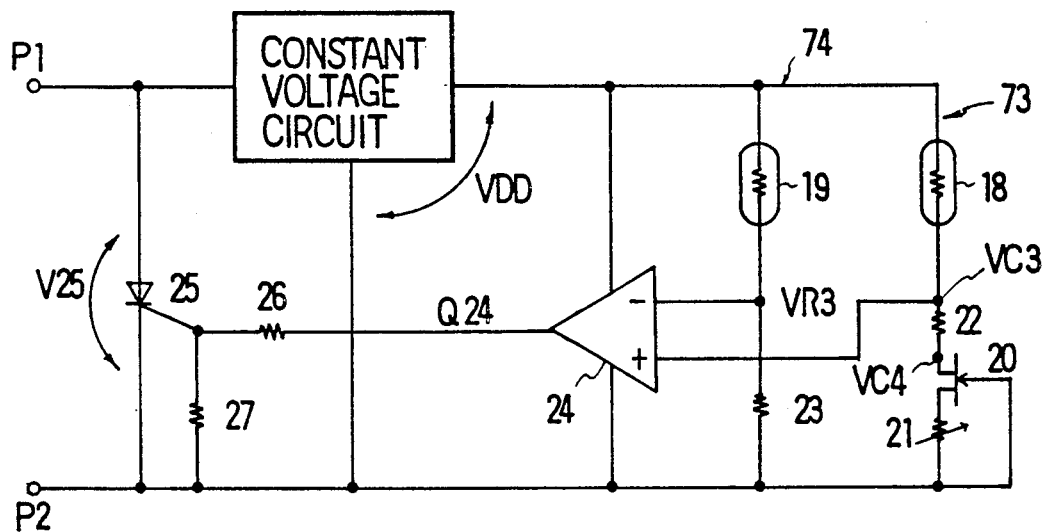
FIG. 7 is circuit diagram which illustrates a fourth embodiment of the compensation type heat sensor according to the present invention.

Then, a fourth embodiment of the compensation type heat sensor according to the present invention will now be described with reference to FIG. 7. FIG. 7 is a circuit diagram which illustrates the structure of circuit for sue in this embodiment. This embodiment is arranged in this way that the temperature detection devices connected to one another in series in the structure according to the first embodiment are connected in parallel. Also in this case, the thermistors 18 and 19 having a negative temperature coefficient and different heat time constants similarly to the first embodiment, the thermistor 19 having a larger heat time constant than that of the thermistor 18.

As shown in FIG. 7, this embodiment is arranged in this way that a first series circuit network 73 in which the thermistor 18 (a first temperature detection device), the resistor 22 having a predetermined value and the junction type field effect transistor 20 (active device) are connected in series and a second series circuit network 74 in which the thermistor 19 and the resistor 23 having a predetermined value are connected in series are connected in parallel. The voltage VR3 at the junction between the thermistor device 18 and the resistor 22 is supplied to the reversal input contact of the comparator 24. On the other hand, the voltage VC3 at the junction between the thermistor device 19 and the resistor 23 is supplied to the non-reversal input contact of the comparator 24. Similarly to the first embodiment, the logical value of the output signal Q24 of the comparator 24 is changed depending upon the relationship between VR3 and VC3 in terms of the level. As a result, the thyristor device 25 is turned on/off to change the impedance between the connection contacts P1 and P2, so that alarm information is transmitted to the receiver (omitted from illustration).

Also in this embodiment, three conditions for setting the bias of the transistor 20 are employed. That is, as the first condition, the transistor 20 must be operated in the triode region as the thermistor device 18 is changed before the temperature of the supervisory region is raised to a certain temperature (for example, 60° C.) and the same must be operated in a saturated region if the temperature has been raised to a level higher than the dangerous level. In order to achieve this, the value of the resistor 21 is determined in accordance with the temperature characteristics of the thermistor device 18 and the characteristics of the transistor 20.

The second condition is set in this manner that, in a case where the temperature rise slowly, the voltage VC3 of the connection contact and the reference voltage VR3 always hold the relationship VC3<VR3 if the transistor 20 is operated in the triode region and the relationship VC3>VR3 is held if the temperature has been raised to the dangerous level. In order to achieve this, the value of the resistor 21 is determined in accordance with the temperature characteristics of the thermistor devices 18 and 19 and the characteristics of the transistor 20.

A third condition is set in such a manner that the relationship VC3>VR3 must be held if the temperature is not raised to the dangerous level in a case where the temperature is rapidly raised in a state where the transistor 20 is operated in the triode region. In order to achieve this, the value of the resistor 21 is determined in accordance with the temperature characteristics of the thermistor devices 18 and 19 and the characteristics of the transistor 20.

Then, the operation of the compensation type heat sensor according to this embodiment will now be described.

The operation of the structure according to this embodiment is basically the same as that of the structure according to the first embodiment. However, the thermistor 19 having a large time constant is used in the reference voltage portion in the structure according to this embodiment and therefore the potential of VR3 is raised as the temperature is raised. Therefore, the bias setting conditions must be set while taking the following facts into consideration.

Figure 8:
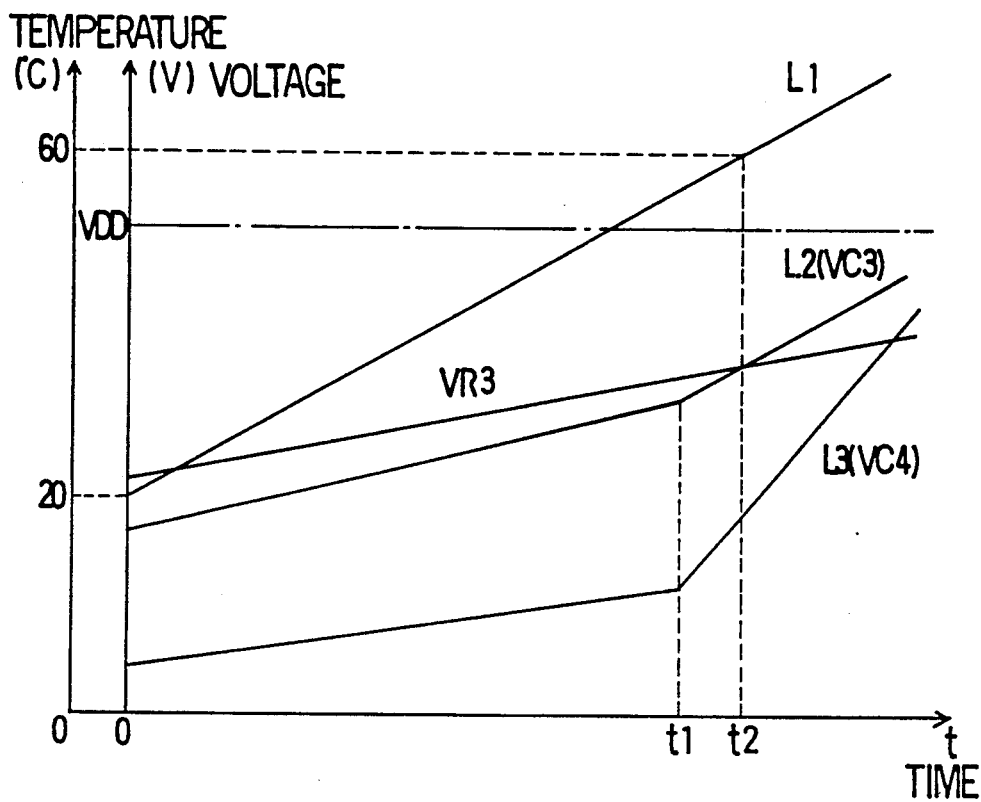
FIG. 8 is a graph which illustrates the constant temperature function of the circuit shown in FIG. 7.

Also in this embodiment, if the temperature is raised slowly, VR3 and VC3 are changed as shown in FIG. 8. In this case, the transistor 20 is operated in the triode region before time t1 and is operated in the saturated region at time t2. The transistor 20 is set to realize the relationship VC3<VR3 before the temperature is raised to the dangerous level and to realize the relationship VC3>VR3 when the temperature has been raised to the dangerous level, so that the status change is detected. Thus, the constant temperature function can be obtained.

Figure 9:
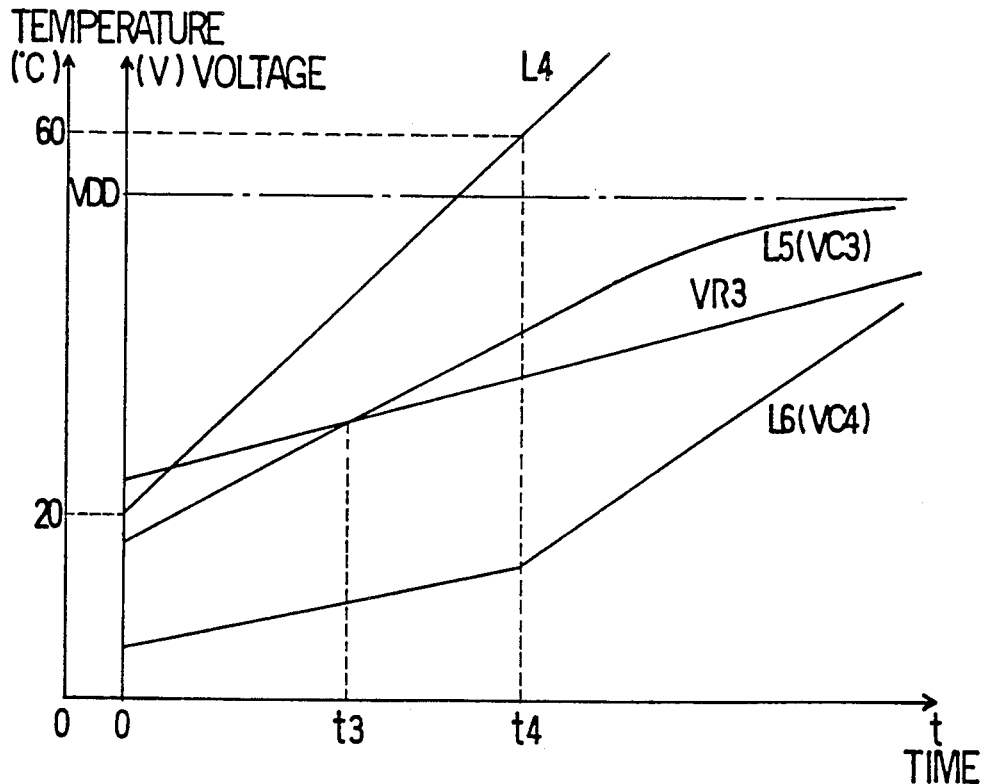
FIG. 9 is a graph which illustrates a differential function of the circuit shown in FIG. 1.

In a case where the temperature is raised rapidly, VR3 and VC3 are changed as shown in FIG. 9. The transistor 20 is operated in the triode region before the time t4 and is operated in the saturated region after the time t4. If the temperature is lower than the dangerous level, the relationship VC3>VR3 is held, so that the differential function is obtained.

Figure 10:
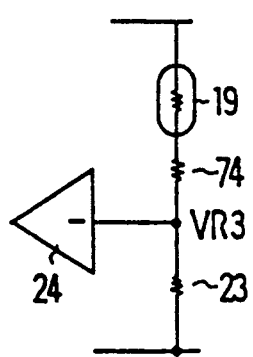
FIGS. 10(a), 10(b), and 10(c) are circuit diagrams which illustrates another example of the circuit for use in the fourth embodiment.
Figure 10:
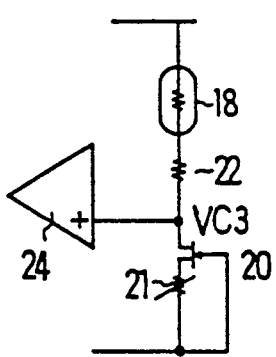
Figure 10:
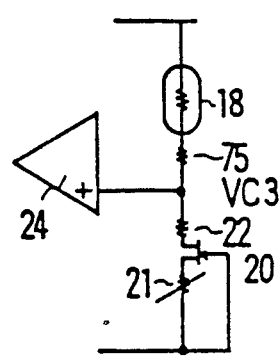
Figure 11:
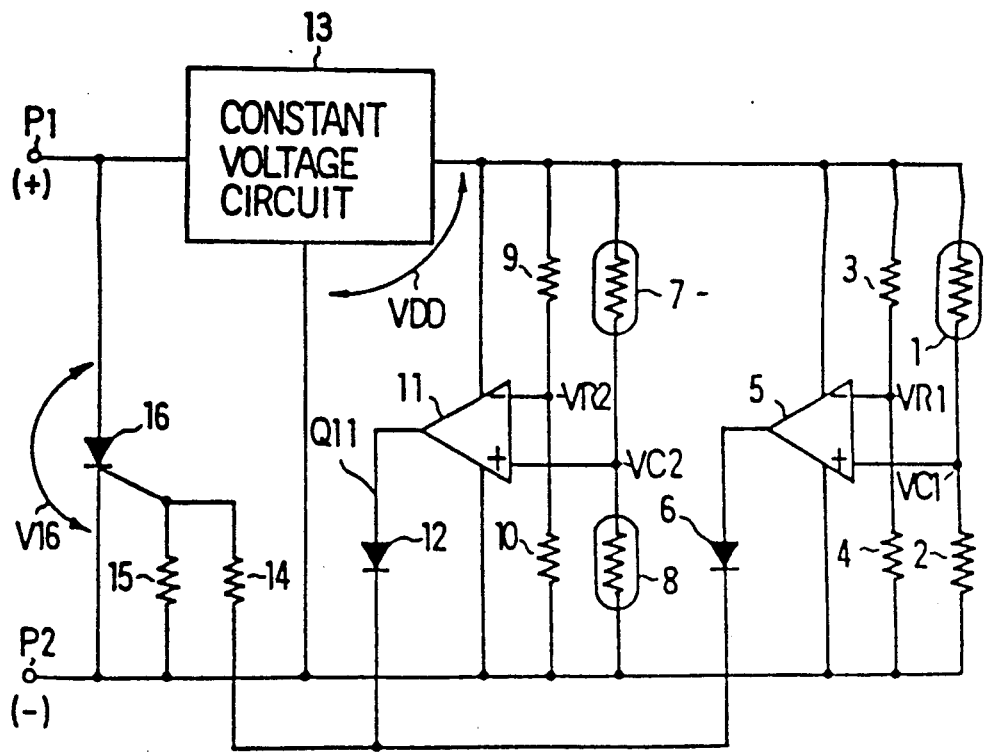
FIG. 11 is a circuit diagram which illustrates a conventional compensation type heat sensor.
Figure 13:
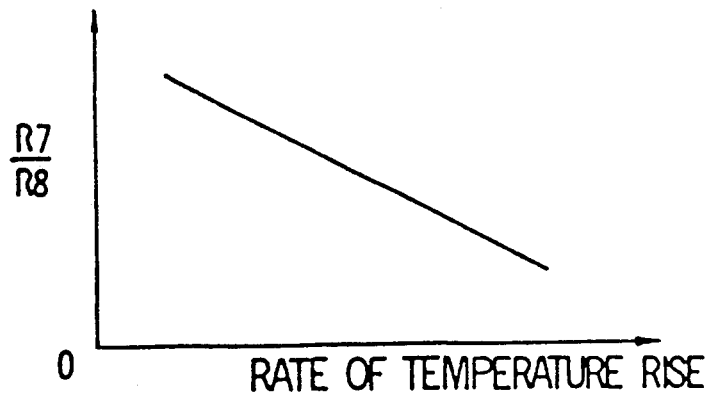
FIG. 13 is a graph which illustrates the differential function of the conventional compensation type heat sensor.
Figure 12:
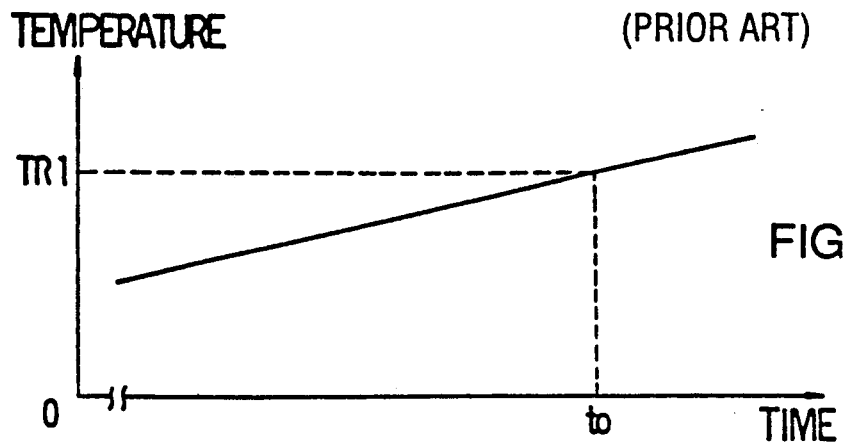
FIGS. 12(A), 12(B), 12(C), and 12(D) are graphs which illustrate the constant temperature function of the conventional compensation type heat sensor.
Figure 12:
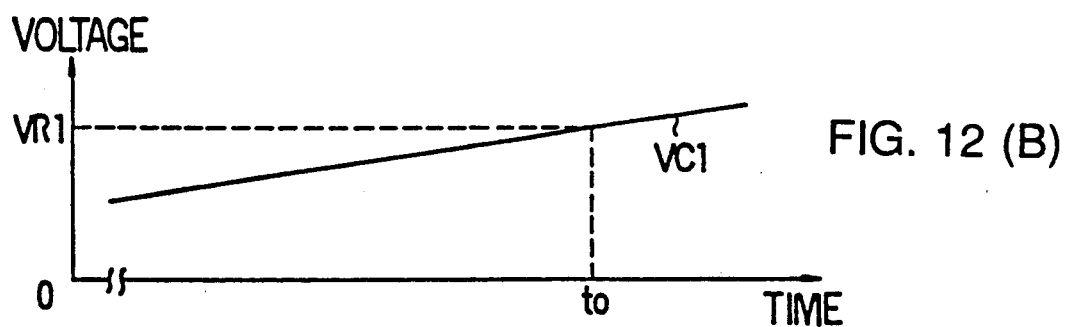
Figure 12:
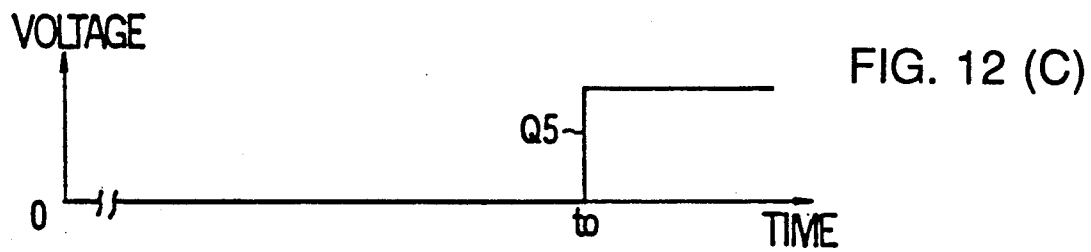
Figure 12:
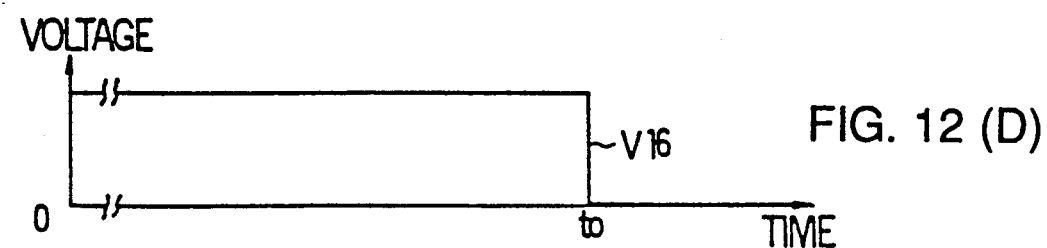

The third embodiment is not limited to the circuit shown in FIG. 7 and may comprise a circuit shown in FIGS. 10(a) to 10(c). That is, as shown in FIG. 10(a); the second series circuit network may comprise a resistor 74 disposed between the thermistor 19 and the resistor 23 so as to supply VR3 to the comparator 24 from an intermediate position between the resistor 74 and the resistor 23.

Furthermore, the first series circuit network may, as shown in FIG. 10(b), be arranged to supply VC3 to the comparator 24 from an intermediate position between the resistor 22 and the resistor 20.

Furthermore, as shown in FIG. 10(c), another structure may be employed which comprises a resistor 75 disposed between the thermistor 18 and the resistor 22 so as to supply VC3 to the comparator 24 from an intermediate position between the resistor 75 and the resistor 22.

Finally, to make a detector smaller it is possible to put the circuit parts of detector shown in Figures into IC (integrating).

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

I claim:

1. A compensation type heat sensor comprising:
   two temperature detection devices having respectively a small heat time constant and a large heat time constant, said two temperature detection devices having a negative temperature coefficient;
   an active device with bias and connected in series with said two temperature detection devices before being connected to a predetermined power source;
   said two temperature detection devices being selected and the bias of said active device being set so that
   said active device operates in a triode region as a resistance value of each of said temperature detection devices is changed before a temperature of a supervisory region is raised to a predetermined dangerous level, said active device operating in a saturated region when said temperature has been raised to said dangerous level;
   and when said temperature is raised slowly while said active device operates in said triode region, a voltage at a junction of said temperature detection devices is always lower than a reference voltage, said voltage at said junction becoming higher than said reference voltage when said temperature has been raised to said dangerous level,
   but if said temperature is raised rapidly while said active device operates in said triode region, the voltage at said junction of said temperature detection devices becomes higher than said reference voltage even if said temperature is not raised to said dangerous level; and comparison means detecting that said voltage at said junction has exceeded said predetermined reference voltage to determine that a fire has taken place.

2. A compensation type heat sensor as defined in claim 1 wherein each said temperature detection device is a thermistor.

3. A compensation type heat sensor as defined in claim 1, wherein said active device is a transistor.

4. A compensation type heat sensor comprising:
a first series circuit network formed by a series combination of a first temperature detection device having a small heat time constant, a resistor and an active device connected across a predetermined power source;
a second series circuit network formed by a series combination of a second temperature detection device having a heat time constant larger than that of said first temperature detection device and a resistor connected across said predetermined power source;
said first temperature detection device and a bias of said active device being set so that
said active device operates in a triode region as a resistance value of each of said temperature detection devices is changed before a temperature of a supervisory region is raised to a predetermined dangerous level, said active device operating in a saturated region when said temperature has been raised to said dangerous level;

and when said temperature is raised slowly while said active device operates in said triode region, a voltage of said first temperature detection device is always lower than that of said second temperature detection device, said voltage of said first temperature detection device being raised to a level higher than that of said second temperature detection device when said temperature has been raised to said dangerous level;

but if the temperature is raised rapidly while said active device operates in said triode region, the voltage of said first temperature detection device is raised to a level higher than that of said second temperature detection device even if said temperature is not raised to said dangerous level; and comparison means detecting that said voltage of said first temperature detection device has exceeded the voltage of said second temperature detection device to determine that a fire has taken place.

5. A compensation type heat sensor as defined in claim 4, wherein each said temperature detection device is a thermistor.

6. A compensation type heat sensor as defined in claim 4, wherein said active device is a transistor.

* * * * *